United States Patent [19]

Ridgway

[11] 3,854,199

[45] Dec. 17, 1974

[54] MANUFACTURE OF MAGNETIC TRANSDUCING HEADS

[75] Inventor: Peter Charles Ridgway, Staines, England

[73] Assignee: International Computers Limited, London, England

[22] Filed: Apr. 13, 1973

[21] Appl. No.: 350,981

[30] Foreign Application Priority Data

Apr. 15, 1972 Great Britain .................... 17477/72

[52] U.S. Cl. .................................... 29/603, 360/126

[51] Int. Cl. ............................................ G11b 5/42

[58] Field of Search ....... 179/100.2 C; 340/174.1 F; 346/74 MC; 29/603; 360/126, 125, 122

[56] References Cited

UNITED STATES PATENTS

| | | | |
|---|---|---|---|
| 2,885,488 | 5/1959 | Andrews | 179/100.2 C |
| 2,984,709 | 5/1961 | Rettinger | 179/100.2 C |
| 3,414,971 | 12/1968 | Boehme | 29/603 |
| 3,479,663 | 11/1969 | Morrison et al. | 340/174.1 F |

*Primary Examiner*—Stuart N. Hecker

*Attorney, Agent, or Firm*—Misegades, Douglas & Levy

[57] ABSTRACT

A magnetic head production process is described which involves threading apertured laminations on to a centre member to form a bonded stack, machining opposite sides of the stack, bonding a C-shaped core member in spaced relation to each of the sides and machining a further surface on the bonded assembly, the further surface constituting the working face of the finished head, and having a pair of magnetic gaps transverse of the working surface, with a portion of the centre member exposed in the surface and lying between the gaps.

3 Claims, 4 Drawing Figures

PATENTED DEC 17 1974 3,854,199

MANUFACTURE OF MAGNETIC TRANSDUCING HEADS

BACKGROUND OF THE INVENTION

The present invention relates to the manufacture of magnetic transducing heads.

It has previously been proposed to produce a magnetic transducing head consisting of two parts each of which are constructed from thin bonded together laminations of a magnetic material having a high permeability. One of the two parts may be C-shaped and the other of the two parts may be I-shaped and spaced relative to the C-shaped part so as to complete the magnetic circuit and to provide an operating gap. A transducing coil is wound about one of the two members.

It has also previously been proposed to produce such heads having more than one gap for initially recording and subsequently reading and/or erasing on the same track. Such multi-gap heads may be effectively composed of two of the heads previously described arranged in back-to-back relationship with the I-shaped parts adjacent one another. In this case in order to keep interaction or cross-talk between the operating gaps to a minimum, while at the same time keeping the inter-gap distance small, it has been proposed to provide a magnetic shield between the adjacent I-shaped parts. Thus, the provision of such a shield makes possible the design of a compact multi-gap head. However, difficulties have been experienced in the production of such compact heads due to the small size of the component parts and to the accurate manufacture and assembly of these parts.

SUMMARY OF THE INVENTION

A method of manufacture of a magnetic transducing head includes the steps of, providing a first member; providing a plurality of magnetic laminations each with an aperture therein, the apertures being aligned on a common axis; assembling the laminations on to the first member, the first member passing through the apertures of all the laminations; bonding the laminations to one another and to the first member to form an aligned stack; forming two flat parallel surfaces on opposite edges of the stack; forming an assembly by bonding two magnetic laminer C-shaped members each terminating in a pair of co-planar surfaces one to each of said flat surfaces of the stack with said co-planar surfaces of each C-shaped member being spaced from the respective flat surface to which it is bonded, the first member lying between the C-shaped members, the laminations of the stack and the laminations of the C-shaped members lying in parallel planes; removing material from the bonded assembly to form a face parallel to said common axis, the first member being at least partially exposed on the face so formed to produce a surface having two magnetic gaps respectively between the C-shaped members and the stack.

BRIEF DESCRIPTION OF THE DRAWINGS

A method of manufacturing a magnetic transducing head embodying the present invention will now be described, by way of example, with reference to the accompanying drawing, in which.

DESCRIPTION OF THE PREFERRED EMBODIMENT

Figure 1:
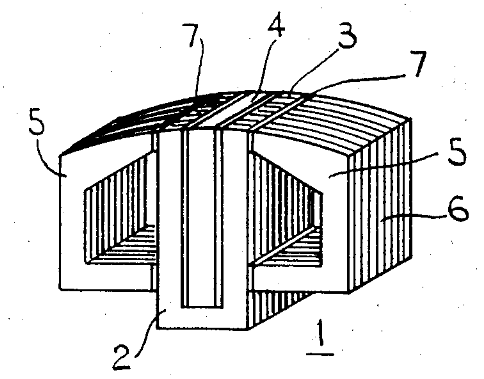
FIG. 1 shows a single track, twin gap magnetic head.

Referring now to FIG. 1 of the drawing a single track, twin-gap magnetic head assembly 1 consists of a centre core portion 2 formed from magnetic laminations 3 bonded together. A magnetic screen 4 is positioned within centre core portion 2. Two substantially C-shaped core members 5, formed from bonded together magnetic laminations 6, are bonded to the centre portion 2 in spaced relationship therewith to provide two operating gaps 7.

A method of manufacturing a magnetic head as shown in FIG. 1 will now be described with reference to FIGS. 1 to 3. The magnetic screen 4 consists of a body 8 of magnetic material having a high permeability, such as, for example, Mu-metal, with a thin layer 9 of non-magentic material such as copper on either side. The magnetic laminations 3 are rectangular in shape and are constructed from a high permeability magnetic material, such as, for example, Mu-metal. Each lamination 3 contains a rectangular aperture 10, the dimensions of which closely correspond to the cross-sectional dimensions of the magnetic screen 4 so that the laminations 3 are sliding fit on the magnetic screen 4. Thus, the laminations 3 may now be threaded on to the magnetic screen 4, the screen 4 serving as an assembly jig to locate and align the laminations 3. The laminations 3 may be produced by, for example, precision etching techniques.

The laminations 3 are bonded to one another and to the magnetic screen 4. The bonding may be accomplished by using any suitable bonding agent, such as for example, a thermo-setting adhesive. The existance of resultant layers of bonding agent between the laminations provides insulating spacers between the laminations. Sufficient laminations are assembled on the magnetic screen 4 to provide the required track width. The length *b* of the screen 4 may be arranged to correspond to the thickness of the stack to produce an assembly in which the ends of the screen are substantially flush with the ends of the stack, or alternatively, the length *b* of the screen 4 may be arranged so that its ends project from the stack to provide convenient mounting means.

Figure 2B:
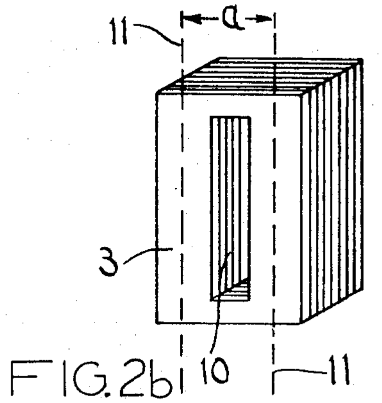
FIG. 2*b* shows a plurality of magnetic laminations arranged for assembly on the magnetic screen.
Figure 2A:
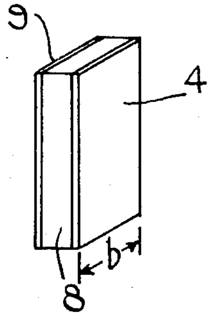
FIG. 2*a* shows a magnetic screen.

Two opposite edges of the stack are now machined as indicated by the broken lines 11 shown in FIG. 2*b*. This operation may be conveniently carried out by grinding, for example, sufficient material being removed to establish dimension *a*, which determines the distance between the two operating gaps 7. In addition to establishing dimension *a* the machining operation also ensures that the opposite edges of the stack are parallel with one another and have flat surfaces 12, shown in FIG. 3.

The next step in the process is to produce the two C-shaped core members 5. This is accomplished by bonding together a number of C-shaped laminations 6. The C-shaped laminations 6 are formed from similar high permeability magnetic material as that from which the laminations 3 are formed and are bonded together in the same way as the laminations 3 to provide stacks corresponding in thickness to core portion 2. After the bonding operation the edges of the members 5 are machined at their extremities so that each of the C-shaped members terminates in a pair of co-planar surfaces 13. This operation, of course, may be carried out by a grinding process as in the case of surfaces 12.

Figure 3:
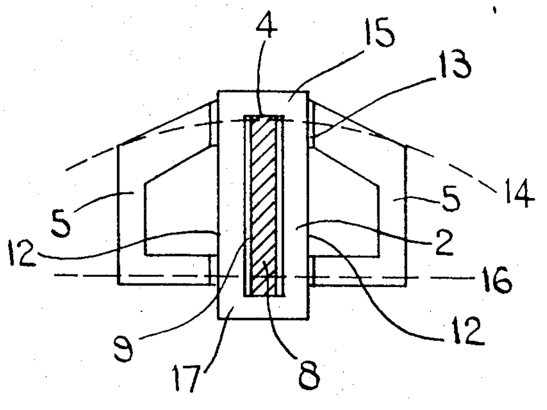
FIG. 3 shows a section through an assembly at one stage during the manufacture of a magnetic head.

The C-shaped core members 5 are now bonded to the flat surfaces 12 of the centre core portion 2 as shown in FIG. 3. The two surfaces 13 on each C-shaped member 5 are required to be spaced from the flat surfaces 12 on the centre core portion 2 in order to provide operating gaps 7. Such spacing may be attained by bonding a spacer of non-magnetic material in the gaps, for example. A bonding agent similar to the one employed to bond the laminations may be utilised for this operation.

The final step in the process consists of machining the assembly along broken line 14, (FIG. 3), thus removing the entire portion 15 of the core portion 2 together with portions of the C-shaped core members 5. This operation produces a finished head as shown in FIG. 1 with an operating surface having two magnetic gaps 7 and a magnetic screen 4 extending from the operating surface between the C-shaped members 5.

The head as described has been found to function satisfactorily but it will be understood that if desired the assembly may be machined along the broken line 16 to remove the lower portion 17, (shown in FIG. 3), thus completely isolating the two magnetic circuits contained in the head and making the head more compact.

It will be understood, of course, that a working head requires the addition of a pair of transducer coils carried one on each of the C-shaped members.

It will also be understood that a multi-track head assembly may be produced utilising this method. In this case the centre core portion is made up of a number of the stacks as previously described alternately threaded on a common screen with inter-track spacers. The C-shaped core portions are formed from a number of the previously described stacks interleaved with inter-track spacers. Thus a single assembly can be built up in which any number of pairs of gaps are disposed in side-by-side relationship.

I claim:

1. A method of manufacture of a magnetic transducing head including the steps of providing a first member; providing a plurality of magnetic laminations each with an aperture therein, the apertures being aligned on a common axis; assembling the laminations on to the first member, the first member passing through the apertures of all the laminations; bonding the laminations to one another and to the first member to form an aligned stack; forming two flat parallel surfaces on opposite edges of the stack; forming an assembly by bonding two magnetic laminar C-shaped members, each terminating in a pair of co-planar surfaces, one to each of said flat surfaces of the stack with said co-planar surfaces of each C-shaped member being spaced from the respective flat surface to which it is bonded, the first member lying between the-C-shaped members, the laminations of the stack and the laminations of the C-shaped members lying in parallel planes; removing material from the bonded assembly to form a face parallel to said common axis, the first member being at least partially exposed on the face so formed to produce a surface having two magnetic gaps respectively between the C-shaped members and the stack.

2. A method of manufacture as claimed in claim 1 including the step of forming said first member by interposing a first layer of high permeability magnetic material between two second layers of non-magnetic material, the first member then being positioned within the assembly so that the planes of the first and second layers lie at right angles to the planes of said laminations and perpendicular to said face, the first member being effective to form a magnetic screen between said two magnetic gaps.

3. A method as claimed in claim 1 including the steps of interposing non-magnetic spacers between a plurality of groups of said magnetic laminations when assembling the laminations on to the first member to form a plurality of aligned stacks separated by non-magnetic spacers; tnd interposing non-magnetic spacers between a corresponding plurality of groups of magnetic laminations of said C-shaped members; bonding said C-shaped members one to each of the flat surfaces with said groups of magnetic laminations aligned in opposing relationship so that upon carrying out the step of removing material from the bonded assembly a plurality of pairs of aligned magnetic gaps are produced.

* * * * *